United States Patent
Olekas et al.

(10) Patent No.: US 11,616,959 B2
(45) Date of Patent: Mar. 28, 2023

(54) RELATIONSHIP MODELING OF ENCODE QUALITY AND ENCODE PARAMETERS BASED ON SOURCE ATTRIBUTES

(71) Applicant: SSIMWAVE INC., Waterloo (CA)

(72) Inventors: Christopher Vytautas Olekas, Breslau (CA); Peter Olijnyk, Kitchener (CA); Jiheng Wang, Waterloo (CA); Kai Zeng, Kitchener (CA)

(73) Assignee: SSIMWAVE, Inc., Waterloo (CA)

( * ) Notice: Subject to any disclaimer, the term of this patent is extended or adjusted under 35 U.S.C. 154(b) by 0 days.

(21) Appl. No.: 17/380,822

(22) Filed: Jul. 20, 2021

(65) Prior Publication Data

US 2022/0030247 A1 Jan. 27, 2022

Related U.S. Application Data

(60) Provisional application No. 63/055,945, filed on Jul. 24, 2020.

(51) Int. Cl.
| | |
|---|---|
| *H04N 19/154* | (2014.01) |
| *H04N 19/30* | (2014.01) |
| *H04N 19/80* | (2014.01) |
| *H04N 19/60* | (2014.01) |
| *G06T 9/00* | (2006.01) |
| *G06T 3/40* | (2006.01) |

(52) U.S. Cl.
CPC ......... *H04N 19/154* (2014.11); *G06T 3/4046* (2013.01); *G06T 9/002* (2013.01); *H04N 19/30* (2014.11); *H04N 19/60* (2014.11); *H04N 19/80* (2014.11)

(58) Field of Classification Search
CPC ...... H04N 19/154; H04N 19/30; H04N 19/60; H04N 19/80; G06T 3/4046; G06T 9/002
See application file for complete search history.

(56) References Cited

U.S. PATENT DOCUMENTS

| | | |
|---|---|---|
| 8,290,038 B1 | 10/2012 | Wang et al. |
| 2016/0212432 A1 | 7/2016 | Wang et al. |
| 2016/0358321 A1 | 12/2016 | Xu et al. |

(Continued)

OTHER PUBLICATIONS

Bosse et al., Deep Neural Networks for No-Reference and Full-Reference Image Quality Assessment, IEEE Transactions on Image Processing, vol. 27, No. 1, Jan. 2018.

(Continued)

*Primary Examiner* — Jae N Noh
(74) *Attorney, Agent, or Firm* — Brooks Kushman P.C.

(57) ABSTRACT

A source quality of a source video and a source content complexity of the source video are identified. Parameter constraints with respect to parameters of an operation are received. The source video quality, source content complexity, and parameter constraints are applied to a deep neural network (DNN) producing DNN outputs. In an example, the DNN outputs are combined using domain knowledge to provide the filter parameters, as predicted, to a filter chain, such that applying the filter chain to the input source video results in an output video achieving the full reference video quality score. In another example, the DNN outputs are combined using domain knowledge to provide the filter parameters, as predicted, to a filter chain, such that applying the filter chain to the input source video results in an output video achieving the full reference video quality score.

51 Claims, 12 Drawing Sheets

(56) References Cited

U.S. PATENT DOCUMENTS

| | | |
|---|---|---|
| 2019/0096032 A1 | 3/2019 | Li |
| 2020/0021815 A1 | 1/2020 | Topiwala et al. |
| 2020/0175668 A1 | 6/2020 | Jeong et al. |

OTHER PUBLICATIONS

Bosse et al., Neural Network-Based Full-Reference Image Quality Assessment, 2016 Picture Coding Symposium (PCS), 2016, pp. 1-5, doi: 10.1109/PCS.2016.7906376.

Tiotsop et al., Full Reference Video Quality Measures Improvement Using Neural Networks, STAMPA—(2020), pp. 2737-2741. ((Intervento presentato al convegno IEEE 45th International Conference on Acoustics, Speech, and Signal Processing (ICASSP) tenutosi a Barcelona, Spain nel May 2020 [10.1109/ICASSP40776.2020.9053739].

RELATIONSHIP MODELING OF ENCODE QUALITY AND ENCODE PARAMETERS BASED ON SOURCE ATTRIBUTES

CROSS-REFERENCE TO RELATED APPLICATIONS

This application claims the benefit of U.S. provisional application Ser. No. 63/055,945 filed Jul. 24, 2020, the disclosure of which is hereby incorporated in its entirety by reference herein.

TECHNICAL FIELD

Aspects of the disclosure generally relate to automated relationship modeling of encode quality and encode parameters based on source video inputs.

BACKGROUND

Objective video quality assessment methods predict a perceptual quality of a video, targeted at reproducing or best approximating human visual subjective quality assessment of the video. Depending on the availability of a perfect-quality pristine original video as the reference, VQA methods may be classified into full-reference (FR), reduced-reference (RR) and no-reference (NR) methods. FR methods assume the reference video is fully accessible, RR methods assume that the reference video is partially available in the form of pre-computed features rather than video pixels, and NR methods (or sometimes referred to as blind methods) do not assume availability of the reference video.

SUMMARY

In one or more illustrative examples, a method is provided for predicting a full-reference video quality analysis of a source video that is to be modified via scaling, transcoding, and/or other filters. The method includes identifying a source video quality of the source video; identifying a source content complexity of the source video; receiving target output video parameters to be applied to the source video; applying the source video quality, source content complexity, and target output video parameters to a deep neural network (DNN) producing DNN outputs; and combining the DNN outputs using domain knowledge to produce an overall predicted quality score of an output video created by applying the target output video parameters to the source video.

In one or more illustrative examples, a method is provided of predicting bitrate, codec, resolution, or other filter parameters for a filter chain to achieve a full reference video quality score for encoding an input source video. The method includes identifying a source quality of the source video; identifying a source content complexity of the source video; receiving parameter constraints with respect to the parameters; applying the source video quality, source content complexity, and parameter constraints to a deep neural network (DNN) producing DNN outputs; and combining the DNN outputs using domain knowledge to provide the filter parameters, as predicted, to a filter chain, such that applying the filter chain to the input source video results in an output video achieving the full reference video quality score.

In one or more illustrative examples, a method is provided of predicting a full-reference video quality score of a source video after performance of scaling, transcoding, and/or filtering operations. The method includes identifying a source video quality of the source video; identifying a source content complexity of the source video; receiving content parameters of the source video; receiving player metrics indicative of aspects of playback by a consumer device of an output video corresponding to the source video; receiving parameter constraints with respect to parameters of the output video; applying the source video quality, the source content complexity, the content parameters, the parameter constraints, and the player metrics to a deep neural network (DNN) producing DNN outputs; and combining the DNN outputs using domain knowledge to produce an overall predicted quality score of the output video, without accessing the output video.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

There are numerous choices to be made for compression of a video in terms of parameters, such as output resolution, framerate, codec, and bitrate. In addition, depending on the application, the cost of experimentation may be high. Given a goal to maintain as much of the source quality as possible, an unguided approach to identifying a combination of output parameters may be time consuming and costly. Additionally, one set of output parameters may only work for certain input types or certain files, increasing the time required to search for optimal parameters.

An inference model may be constructed to predict a resulting video quality based on various input attributes in conjunction with various output parameters. These input attributes may include, for example: resolution, framerate, codec (if applicable), bitrate, quality, and/or complexity. The output parameters may include: resolution, framerate, codec, and/or bitrate. Further aspects of the inference modeling are described in detail herein.

Figure 1:
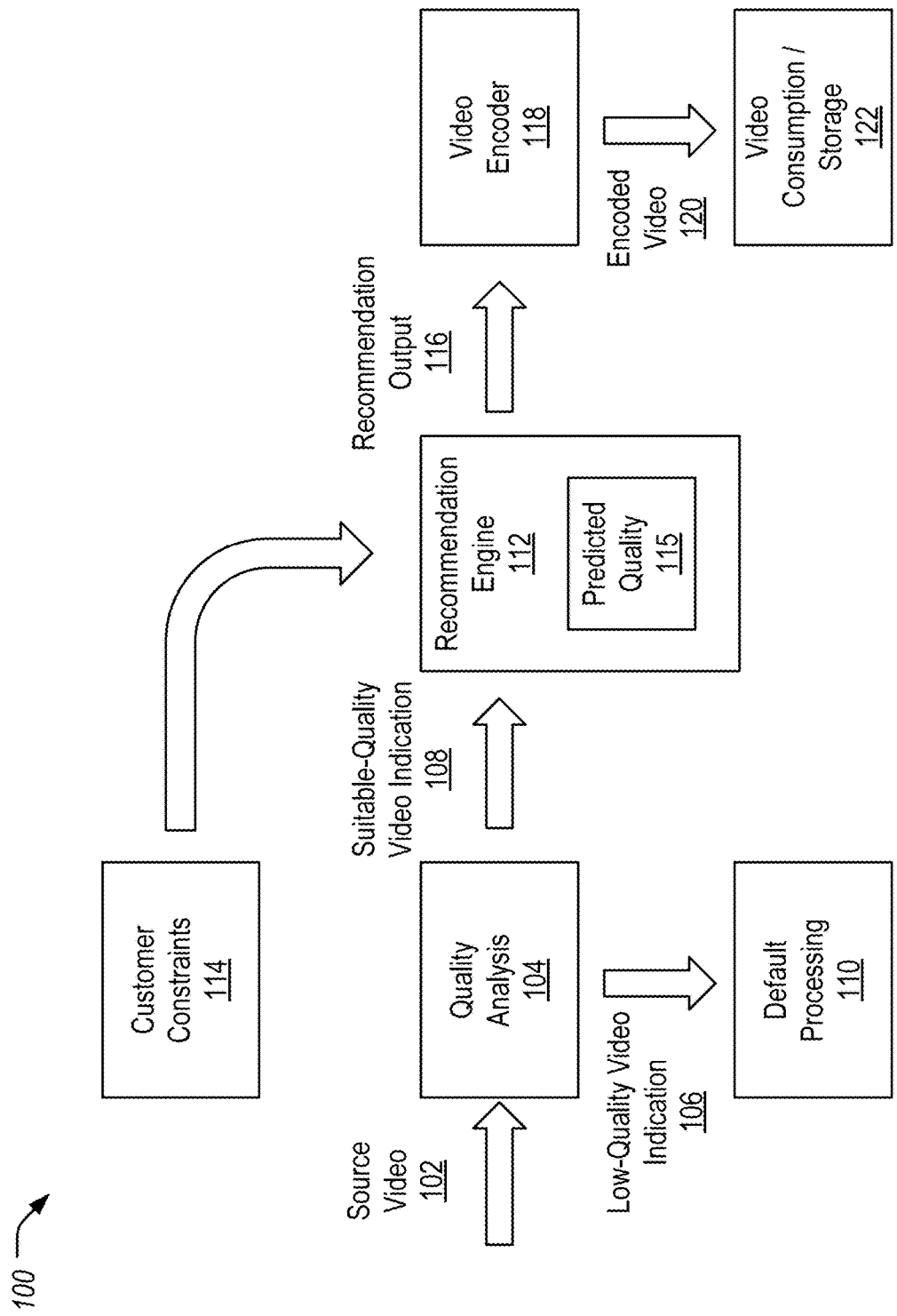
FIG. 1 illustrates an example of a video-on-demand system utilizing a recommendation engine for the determination of predicted video quality.

FIG. 1 illustrates an example of a video-on-demand (VOD) system 100 utilizing a recommendation engine 112 for the determination of predicted video quality 115. A VOD system 100 generally allows a user to stream content, either through a traditional set-top box or through remote devices such as computers, tablets, and smartphones, by requesting the content, not by waiting for the content to be broadcast according to a schedule. As generally shown, an objective quality analysis 104 is performed to a source video 102. If the source video 102 is of a suitable quality, the source video 102 is applied to a recommendation engine 112 (along with customer constraints 114) to produce a recommendation output 116 having a predicted video quality 115. The recommendation output 116 is used to control a video encoder 118, which encodes the source video 102 into an encoded video 120 of the predicted video quality 115.

The source video 102 may include, as some examples, a live video feed from a current event, a prerecorded show or movie, and/or an advertisement or other clip to be inserted into another video feed. The source video 102 may include just video in some examples, but in many cases the source video 102 further includes additional content such as audio, subtitles, and metadata information descriptive of the content and/or format of the video. The source video 102 may be provided in various video formats, for example, Serial digital interface (SDI), transport stream, multicast Internet Protocol (IP), or mezzanine files from content producers/providers.

The video encoders 118 may receive the source video 102 from the sources. The video encoders 118 may be located at a head-end of a VOD video transmission pipeline in an example. The video encoders 118 may include electronic circuits and/or software configured to compress the source video 102 into a format that conforms with one or more standard video compression specifications. The output may be referred to as encoded video 120. Examples of video encoding formats include MPEG-2 Part 2, MPEG-4 Part 2, H.264 (MPEG-4 Part 10), HEVC, Theora, RealVideo RV40, VP9, and AV1. In many cases, the encoded video 120 lacks some information present in the original source video 102, which is referred to as lossy compression. A consequence of this is that the encoded video 120 may have a lower quality than the original, uncompressed source video 102.

In some cases, the video encoders 118 may perform transcoding operations to re-encode the video content from a source format, resolution, and/or bit depth into an instance of video content with a different format, resolution, and/or bit depth. In many examples, the video encoders 118 may be used to create, for each received instance of source video 102 content, a set of time-aligned video streams, each with a different bitrate and frame size. This set of video steams may be referred to as a ladder or compression ladder. It may be useful to have different versions of the same video streams in the ladder, as downstream users may have different bandwidth, screen size, or other constraints.

Spatial information refers to aspects of the information within a frame, such as textures, highlights, etc. Temporal information refers to aspects of the information between frames, such as motion or other differences between frames. In video encoding, the more complex the spatial and temporal content of the source video 102, or even a specific title, scene, frame, the worse the quality of encoded video will be perceived to a viewer when the same amount of bitrate is used during the encoding. However, encoding the source video 102 using a higher bitrate may require additional bandwidth to transmit the video. One solution is to use an encoding ladder to produce multiple different encodes of the content. The ladder may include several encoding configurations or profiles outlining a spectrum of bitrate/resolution combinations used to encode video content. In some cases, multiple adaptive bitrate (ABR) ladders may be used for the same content, for example for different input stream quality levels (e.g., low quality, high quality, etc.), for different output stream quality levels (e.g., low quality service, high quality premium service, etc.), for supporting end user devices that use different decoders, for different output resolutions (e.g., 144p, 240p, 360p, 480p, 720p, 1080p), etc. The video encoders 118 may create, for each received instance of source video 102 content, a set of time-aligned video streams, each having a different bitrate and resolution according to the ladder.

The encoded video 120 may be used for further purposes, once encoded. This may include video consumption and/or storage 122. For example, one or more packagers may have access to the ladders for each of the instances of encoded video 120. The packagers may create segmented video files to be delivered to clients that then stitch the segments together to form a contiguous video stream. The segmented video may include video fragments, as well as a manifest that indicates how to combine the fragments. A user may then choose among the available ladder encodings based on bandwidth or other device requirements.

Significantly, in such a VOD system 100, it may be difficult to obtain information with respect to the ultimate perceived quality of the video being provided to the consumer. However, such quality information may be beneficial to have in order to best perform the compression of the source video 102.

Thus, as further shown in the VOD system 100, a quality analysis 104 may be performed on the source video 102. QoE of a video, as used herein, relates to mapping human perceptual QoE onto an objective scale, i.e., the average score given by human subjects when expressing their visual QoE when watching the playback of a video content. For example, a score may be defined on a scale of 0-100, which can be evenly divided to five quality ranges of bad (0-19), poor (20-39), fair (40-59), good (60-79), and excellent (80-100), respectively. One example objective QoE score is the SSIMPLUS score. It should be noted that the quality analysis 104 may be a no-reference algorithm, as there may be no other version of the source video 102 to use to compare.

If the result of the quality analysis 104 is a low-quality video indication 106 (e.g., a score below a predefined value or range), then default processing 110 may occur, without review by the recommendation engine 112. This may be done, for example, to avoid basing recommendations on video that is of too low-quality to produce good results when modeled. For instance, a minimum quality of the video may serve as a gatekeeper to further processing of the video. The default processing 110 may include various approaches, such as processing of the source video 102 without a recommendation, or rejection of the source video 102 from further processing more generally. If, however, the result of the quality analysis 104 is a suitable-quality video indication 108 (e.g., a score at, within, or above a predefined value or range of quality score), the source video 102 may be applied as an input to the recommendation engine 112.

The recommendation engine 112 may also receive customer constraints 114. These customer constraints 114 may include, for instance, quality assurances for the resultant ladders. As one specific example, this may include an assurance that the output ABR ladder is 10% worse for a highest profile, 15% for a second highest profile, etc., all the way to 30% worse for a lowest profile. The customer constraints 114 may include other constraints as well, such as restrictions on what codecs to use, resolutions to use, maximum bitrate, etc.

The recommendation engine 112 may utilize this information to determine a recommendation output 116 based on an inference model. (Example inference models are discussed in detail below with respect to FIGS. 4-11.) This recommendation output 116 may be used to meet a predicted video quality 115 as inferred by the model. The recommendation output 116 may, accordingly, indicate to the video encoder 118 the parameters to use to encode the source video 102 into encoded video 120 meeting the customer constraints 114. For instance, the recommendation output 116 may include a recommendation for the entire ladder in terms of resolution, bitrate, codec, etc.

Figure 2:
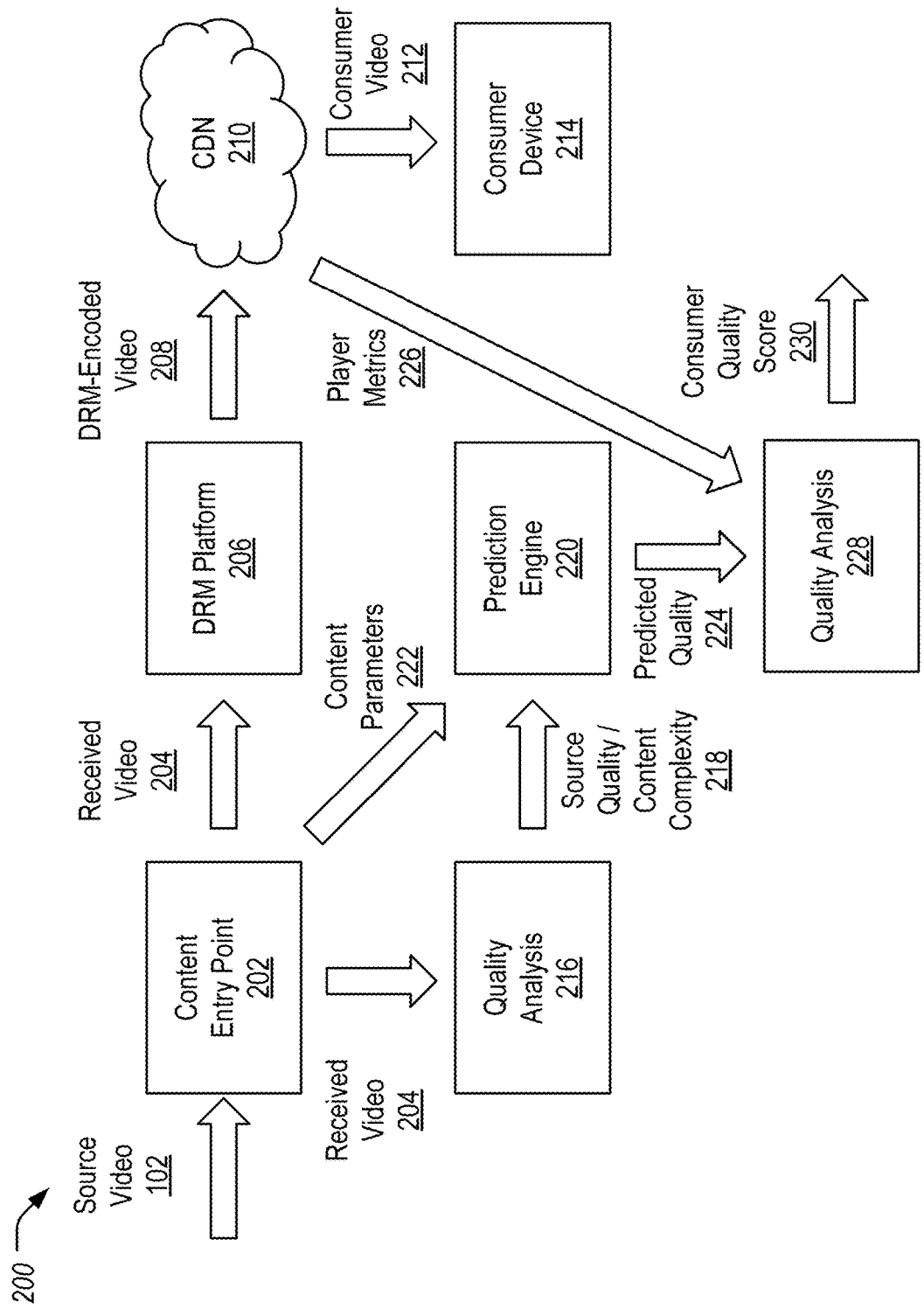
FIG. 2 illustrates an example of an over-the-top system utilizing a prediction engine for the prediction of video quality.

FIG. 2 illustrates an example of an over-the-top (OTT) system 200 utilizing a prediction engine 220 for the prediction of video quality. In general, an OTT system 200 is a streaming media service offered directly to viewers via the Internet, bypassing more traditional cable, broadcast, and satellite television platforms (such as the VOD system 100 discussed above). For such an OTT system 200, it may be desirable to measure the quality at a consumer device 214. However, many OTT systems 200 employ digital rights management (DRM) to ensure integrity of the video delivery chain. Because of this, it may be difficult to measure video stream quality at or close to the consumer device 214. Nor can the quality be inferred simply by using player metrics 226 alone (e.g., buffering events, initial stalling events, profile changes from one profile of an ABR ladder to another, etc.). Instead, as shown, identifying what output parameters customers are employing may provide a best-case scenario view of what the video quality may be at the consumer end. From there, and further accounting for the player metrics 226, a prediction of what the end-user video quality would be may be performed based on processing the source video 102.

More specifically, the source video 102 may be provided to a content entry point 202, which resulted in the reception of received video 204. This received video 204 may be provided to a DRM platform 206 for encoding of the received video 204 using DRM. This results in DRM-encoded video 208. The DRM-encoded video 208 may then be packaged and provided to one or more origins to a content delivery network (CDN) 210. The origins refer to a location of the content delivery network 210 to which video content enters the content delivery network 210. In some cases, the packagers serve as origins to the content delivery network 210, while in other cases, the packagers push the video fragments and manifests into the origins. The content delivery network 210 may include a geographically-distributed network of servers and data centers configured to provide the video content (including the DRM-encoded video 208 content, as shown) from the origins as consumer video 212 to consumer devices 214. The consumer devices 214 may include, as some examples, televisions or other video screens, tablet computing devices, and/or mobile phones. The consumer devices 214 may execute a video player to validate the device, remove the DRM, and play back the content. These varied consumer devices 214 may have different viewing conditions (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.).

The received video 204 may also be provided for processing by a quality analysis 216. This may be done, for instance, as discussed with respect to the quality analysis 104. Moreover, in addition to or in the alternative of generation of a quality score 218, the quality analysis 216 may include the computation of a content complexity score 218. There are several various complexity metrics, such as the sum of absolute differences (SAD) of the pixel values within a frame. A video frame that is all the same color may have a SAD of 0, where if the pixel value alternated between the min and max values the SAD would be a function of the resolution. Complexity can act as a proxy for how well an encoder will preserve the quality at a target bitrate.

The quality score/complexity score 218 may be provided to a prediction engine 220. The prediction engine 220 may be configured to predict the quality of the source video 102 at the consumer device 214, modeled using the quality score/complexity score 218 as well as other information such as content parameters 222 (e.g., resolution, bitrate, codec, etc. of the received video 204. Using these sources of information, and an inference model (e.g., as discussed with respect to FIGS. 4-11), the prediction engine 220 may infer a consumer site predicted quality 224 score. This consumer site predicted quality 224 score and other sources of information, such as the player metrics 226 (e.g., buffering events, profile changes, etc.) may then be provided to a second quality analysis 228 to generate a consumer quality score 230. The prediction engine 220 may also utilize information with respect to the target consumer video 212 parameters post transcode to aid in the prediction in combination with the player metrics 226. For instance, if a pristine 4K source transcoded to 500 kbps at 360p resolution is being played on a 4K TV (in an example), then those target consumer video 212 parameters should additionally be accounted as they may have a significant effect on the consumer quality score 230. In sum, this consumer quality score 230 may be indicative of the quality of the consumer video 212 as played back at the consumer device 214, despite the consumer video 212 not being available for analysis.

Inference models, such as those utilized in the context of the VOD system 100 and the OTT system 200 may therefore be used to infer a predicted quality of a video content while lacking access to the video content itself (or even without the creation of the encoded video). To do so, a model may be created that defines a relationship where, if given a set of input parameters and a target output quality value, the output resolution, framerate, codec and bitrate can be inferred. To reduce the search space, certain parameters of the model may be fixed to help find the value that would create optimal values for the remaining unknowns.

The model may be configured to operate on a per-sequence, or per-title workflow predicting what the best output values would be for a certain segment of video. This model can be trained for different types of video to classify the input to further reduce the search space going forward. For instance, if the user would like to specify parameters for a sports program versus a talking head program, the search space may be tuned for one content type versus the other.

Figure 3:
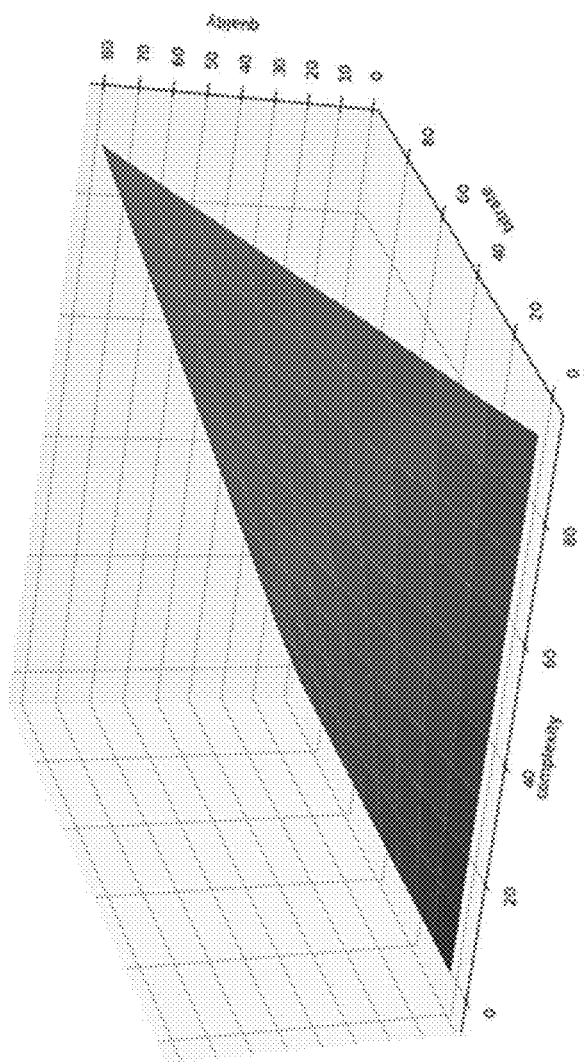
FIG. 3 illustrates an example 3D surface plot of a relationship between video content encoding factors.

FIG. 3 illustrates an example 3D surface plot 300 of a relationship between video content encoding factors. As shown, the relationship is between content complexity, bitrate, and content quality score. As shown, increased quality generally correlates to increased bitrate. For a given input complexity and output bitrate, the output quality can therefore be inferred according to that relationship. This collapses several dimensions but when certain dimensions are fixed, (e.g., codec, resolution, etc.) the predicted output quality may then be determined. Using this and other relationships between video factors, the size of the search space to be modeled may be reduced.

A deep neural network (DNN) may be used to perform the inference between the quality score/complexity score 218 and content parameters 222 and the predicted quality 224. Notably, this predicted quality 224 output is not a full reference score of the current video. Instead the predicted quality 224 is a predicted full reference score of the unobtained output video having had the user parameters applied to it.

Figure 4:
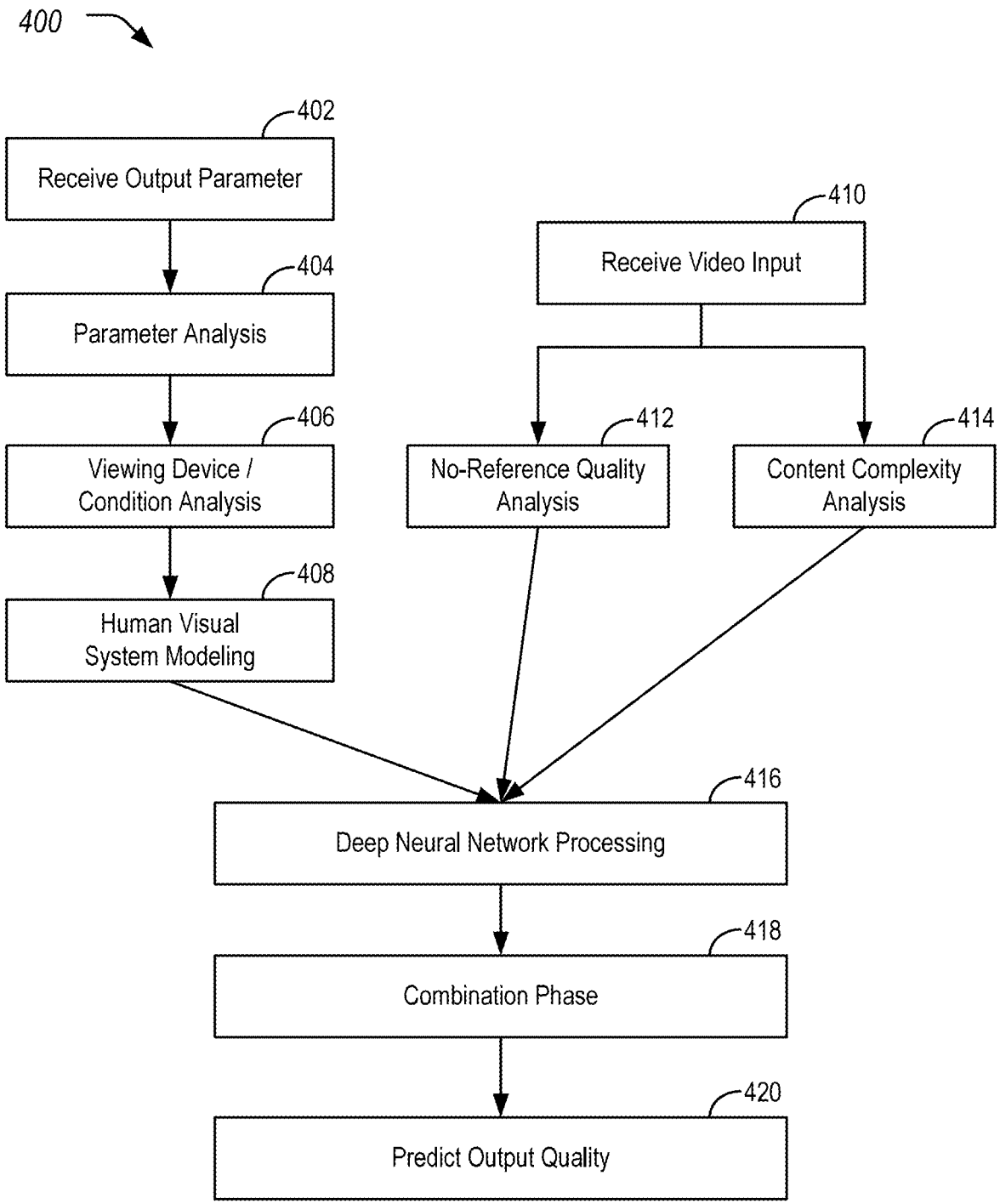
FIG. 4 illustrates an example process for use of a deep neural network inference model to compute a predicted output quality score.

FIG. 4 illustrates an example process for use of a deep neural network (DNN) inference model to compute a predicted output quality score 420. As shown, output parameters are received at operation 402, to which a parameter analysis 404 is performed. Moreover, a viewing device/condition analysis operation 406 is performed to obtain viewing device and viewing condition parameters. This is followed by a human visual system (HVS) modeling operation 408 that takes the above analysis steps as input parameters. A video input 410 whose quality is to be assessed is given. The video input 410 is applied to a no-reference signal quality analysis 412 and/or to a content complexity analysis 414. One or multiple deep neural networks (DNNs) 416 are then applied to the decomposed signals at multiple channels. Finally, a combination operation 418 combines the analysis and modeling results with the DNN 416 outputs to produce a predicted output quality score 420 for the video input 410. Significantly, this predicted output quality score 420 is a predicted full-reference score of unobtained output video that has the user parameters applied to it, not a quality score of the video input 410 itself.

Figure 5:
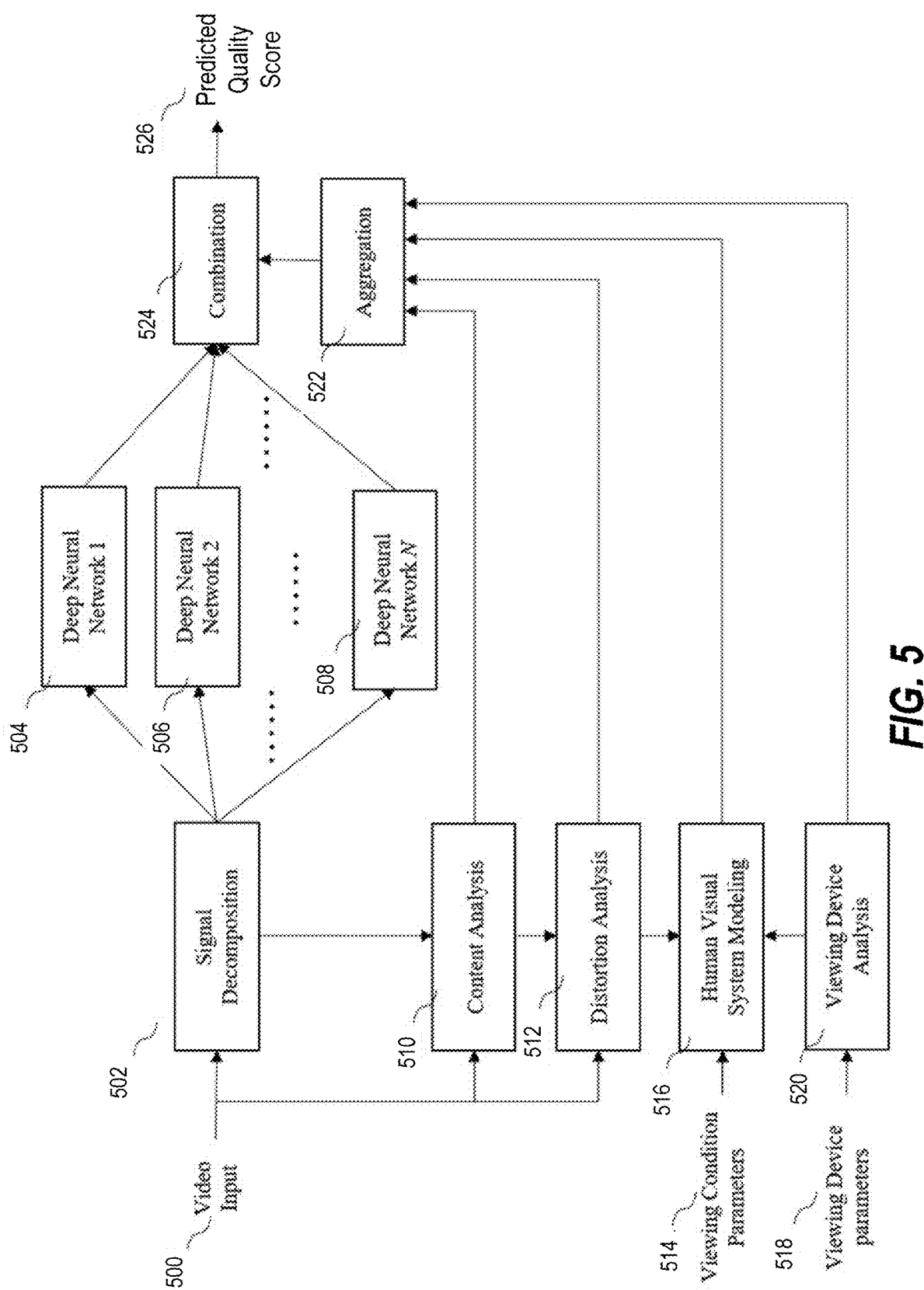
FIG. 5 illustrates an embodiment of a deep neural network inference model used to compute a predicted output quality score.

FIG. 5 illustrates an embodiment of a deep neural network (DNN) inference model used to compute a predicted output quality score 526. As shown, an input video 500 passes through a signal decomposition 502 process that transforms the signal into multiple channels (N channels in total)

For each channel, a deep neural network (DNN) 504, 506, 508 is used to produce a channel-specific quality prediction (N DNNs in total). This prediction may be, for instance, in the form of a scalar quality score or of a quality parameter vector. The signal decomposition results also aid in the analysis of the input video 500 in the content analysis process 510. The distortion analysis process 512 is then applied to identify the distortions and artifacts in the input video 500. Viewing device parameters 514 and viewing condition parameters 518 may be obtained separately and used for HVS modeling 516 and viewing device analysis 520 processes. An aggregation process 522 collects all the information from the outputs of the content analysis process 510, the distortion analysis process 512, the HVS modeling 516, and the viewing device analysis 520, and performs an aggregation to provide aggregate data used to guide the combination process 524 of all DNN outputs, in turn producing an predicted output quality score 526 of the input video 500.

Figure 6:
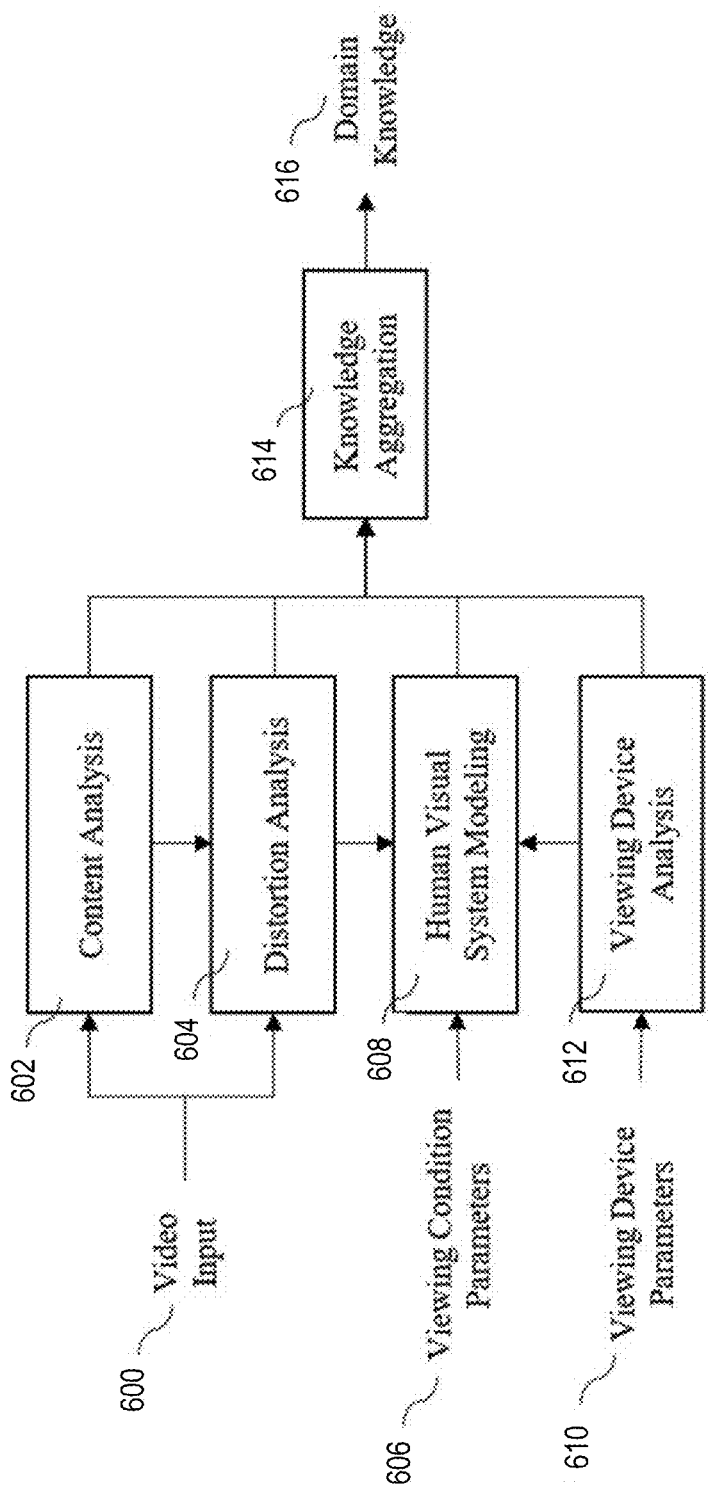
FIG. 6 illustrates yet another embodiment of the present disclosure, illustrating domain-knowledge model computation and knowledge aggregation processes.

FIG. 6 illustrates yet another embodiment of the present disclosure, illustrating domain-knowledge model computation and knowledge aggregation processes. As shown, the video input 600 is first fed into a content analysis module 602. The content analysis module 602 may perform content analysis, including, for instance, content type classification and content complexity assessment. In an example, the video content of the video input 600 may be classified into one or more of the categories of sports, animation, screen content, news, show, drama, documentary, action movie, advertisement, etc. The content may also be classified based on signal activities or complexities. For example, based on the video's spatial information content (strength and spread of fine texture details, sharp edge features, and smooth regions), temporal information content (amount and speed of camera and object motion), color information content (diversities in hue and saturation), and/or noise level (camera noise, film grain noise, synthesized noise, etc.), the video input may be classified into high, moderate, or low complexity categories for each of these criteria.

The video input 600 is also provided through a distortion analysis module 604, where the distortions and visual artifacts in the video input 600 are detected and the distortion levels are evaluated. The causes of distortions may include different types of lossy video compression (such as MPEG-1, MPEG-2, MPEG-4, H.261, H.263, H.264/AVC, H.265/HEVC, DV, VC-1, AV1, VPx, AVSx, FVC, VVC, Motion JPEG, Motion JPEG2000, Pro-Res, Theora, and other types of image/video compression standards) and errors occur during image acquisition, encoding, decoding, transmission, color space conversion, color sampling, spatial scaling, denoising, contrast enhancement, frame rate change, color and dynamic range tone mapping, and rendering. The appearance of visual artifacts may include blur, blocking, banding, ringing, noise, color shift, skin tone shift, color bleeding, exposure shift, contrast shift, highlight detail loss, shadow detail loss, texture loss, fake texture, flickering, jerkiness, jittering, floating, etc. The distortion analysis process may detect and quantify one or more of these artifacts, or produce visibility probability estimation of each of the visual artifacts.

The viewing condition parameters 606 may be obtained separately from the video input 600. The viewing condition parameters 606 may include the viewing distance and lighting condition of the viewing environment. They are used by the HVS modeling module 608 to quantify the visibility of distortions and artifacts. The computational HVS models of the HVS modeling module 608 may incorporate the contrast sensitivity function (CSF) of the visual system, which measures the human visual signal, contrast or error sensitivity as a function of spatial and temporal frequencies and may be functions of the luminance of the display and viewing environment. The HVS model may also incorporate visual luminance masking, which measures the visibility variation of signals due to surrounding luminance levels. The HVS model may also incorporate the visual contrast/texture masking, which measures the reduction of distortion/artifact visibility according to the strength and contrast of signals nearby in terms of spatial and temporal location, spatial and temporal frequency, and texture structure and orientation. The HVS model may also incorporate visual saliency and attention models, which estimate the likelihood/probability of each spatial and temporal location in the video that will attract visual attention and fixations. The HVS model may also incorporate visibility models of specific artifacts of blur, blocking, banding, ringing, noise, color shift, skin tone shift, color bleeding, exposure shift, contrast shift, highlight detail loss, shadow detail loss, texture loss, fake texture, flickering, jerkiness, jittering, floating, etc.

The viewing device parameters 610 may also be obtained separately from the video input 600. The viewing device parameters 610 may include device type and model, screen size, video window size, resolution, brightness, bit depth, and contrast ratio. These parameters are used by the viewing device analysis module 612 for device category classification, and are fed into the HVS modeling module 608 as input.

The results of content analysis module 602, distortion analysis module 604, HVS modeling module 608, and viewing device analysis module 612 are collected by the knowledge aggregation module 614 according to the aggregation process 522, which outputs aggregated domain knowledge 616 to be combined with data-driven DNN results (e.g., via the combination process 524 of FIG. 5 and the combination operation 418 of FIG. 4).

Figure 7:
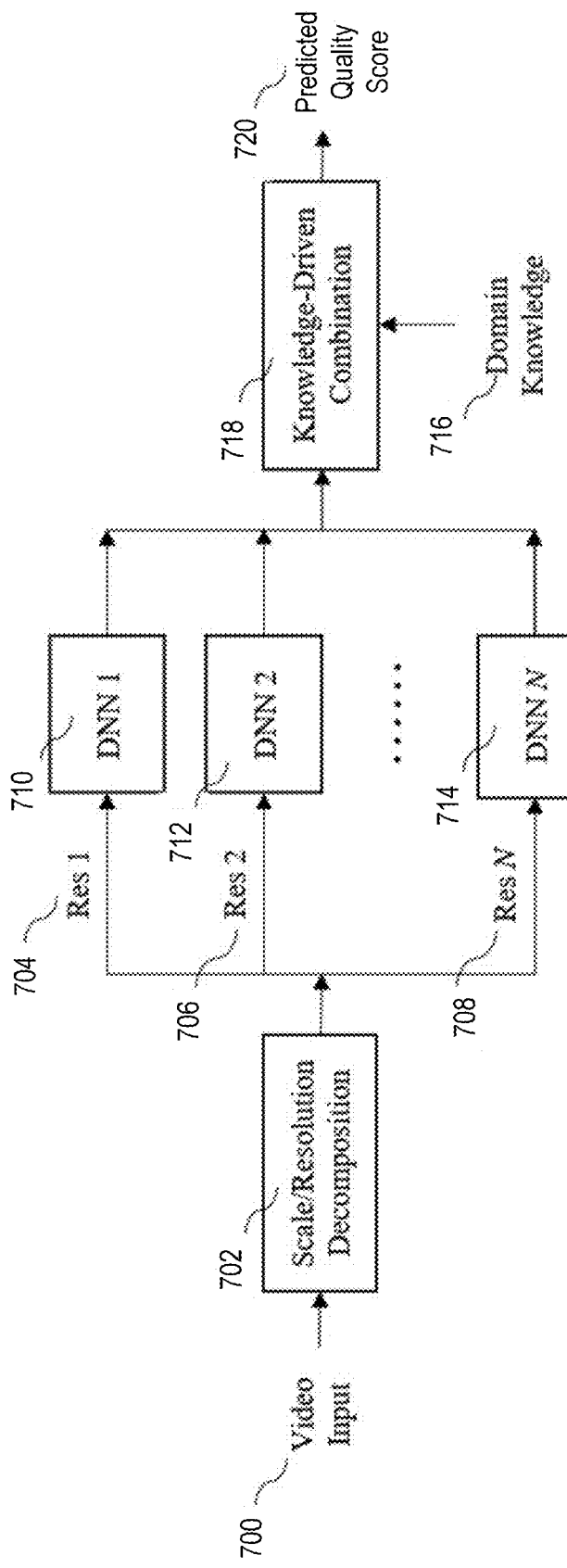
FIG. 7 illustrates the framework and data flow diagram of scale/resolution video decomposition followed by per-resolution channel deep neural network computations and domain-knowledge driven combination.

FIG. 7 illustrates the framework and data flow diagram of scale/resolution video decomposition followed by per-resolution channel DNN computations and domain-knowledge driven combination. Here, the signal decomposition 502 method may be a scale/resolution decomposition 702 that transforms the video input 700 into multi-scale or multi-resolution representations, e.g., as Res 1 (element 704), Res 2 (element 706), . . . , Res N (element 708) as shown. Examples of the decomposition methods include Fourier transforms, the discrete cosine transform (DCT), the discrete sine transform (DST), the wavelet transform, the Gabor transform, the Haar transform, the Laplacian pyramid transform, the Gaussian pyramid transform, the steerable pyramid transform, and other types of frequency decomposition, spatial-frequency decomposition, multi-scale decomposition, and multi-resolution decomposition methods.

The multi-scale multi-resolution representations are fed into a series of DNNs 710, 712, 717, and their outputs are combined using a knowledge-driven approach 718 that is guided by domain knowledge 716, resulting in final quality score 720 of the video input. An example of the domain knowledge 716 used here is the importance or weights created through HVS modeling module 608 that predicts the visual relevance of each of the multi-scale multi-resolution representations.

Figure 8:
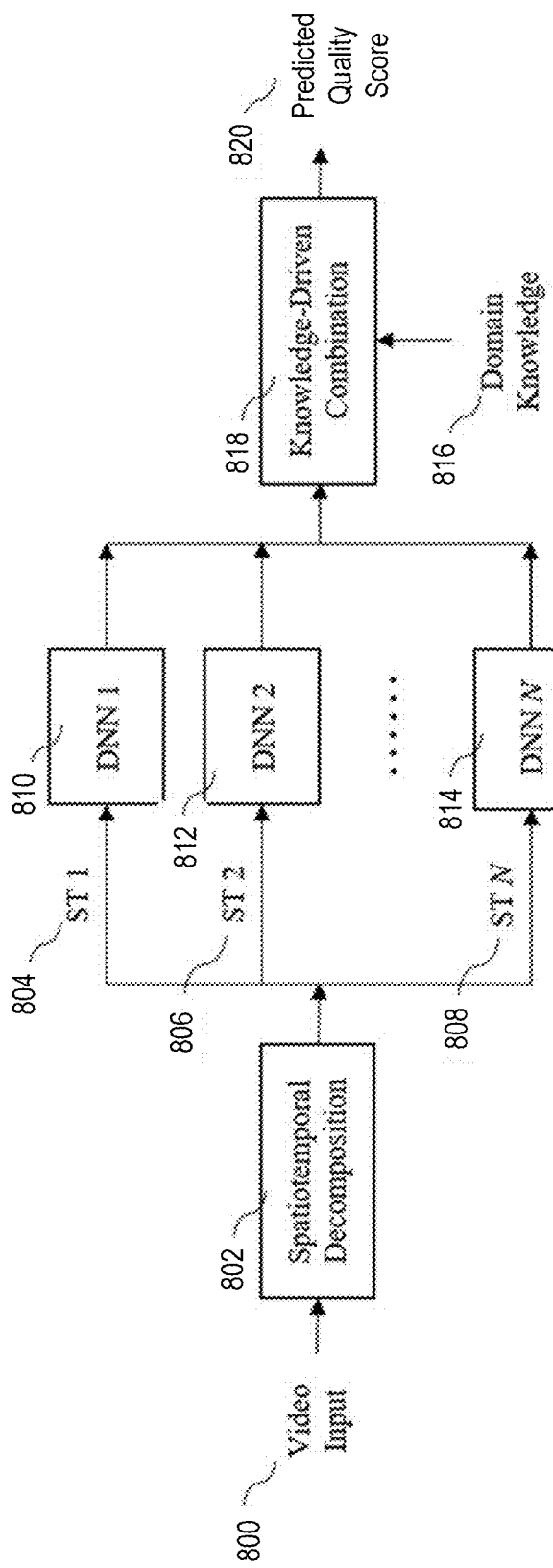
FIG. 8 illustrates the framework and data flow diagram of spatiotemporal decomposition followed by per-spatiotemporal channel deep neural network computations and domain-knowledge driven combination.

FIG. 8 illustrates the framework and data flow diagram of spatiotemporal decomposition followed by per-spatiotemporal channel DNN computations and domain-knowledge driven combination. Here, the signal decomposition 502 method may be a spatiotemporal decomposition 802 that transforms the video input 800 into multiple spatiotemporal channel representations, e.g., as ST 1 (element 807), ST 2 (element 806), . . . , ST N (element 808) as shown. Examples of the decomposition methods include 3D Fourier transforms, 3D DCT, 3D wavelet transform, 3D Gabor transform, 3D Haar transform, 3D Laplacian and Gaussian pyramid transforms, and other types of spatial-temporal-frequency and 3D oriented decomposition methods. These transforms or decompositions may be applied to multiple consecutive frames, or a group-of-picture (GoP).

The spatiotemporal channel representations are fed into a series of DNNs 810, 812, 817, and their outputs are combined using a knowledge-driven approach 818 that is guided by domain knowledge 816, resulting in final quality score 820 of the video input. An example of the domain knowledge 816 used here is the importance or weights created through spatiotemporal HVS modeling via the HVS modeling module 608 that predicts the visual relevance of each of the spatiotemporal channel representations.

Figure 9:
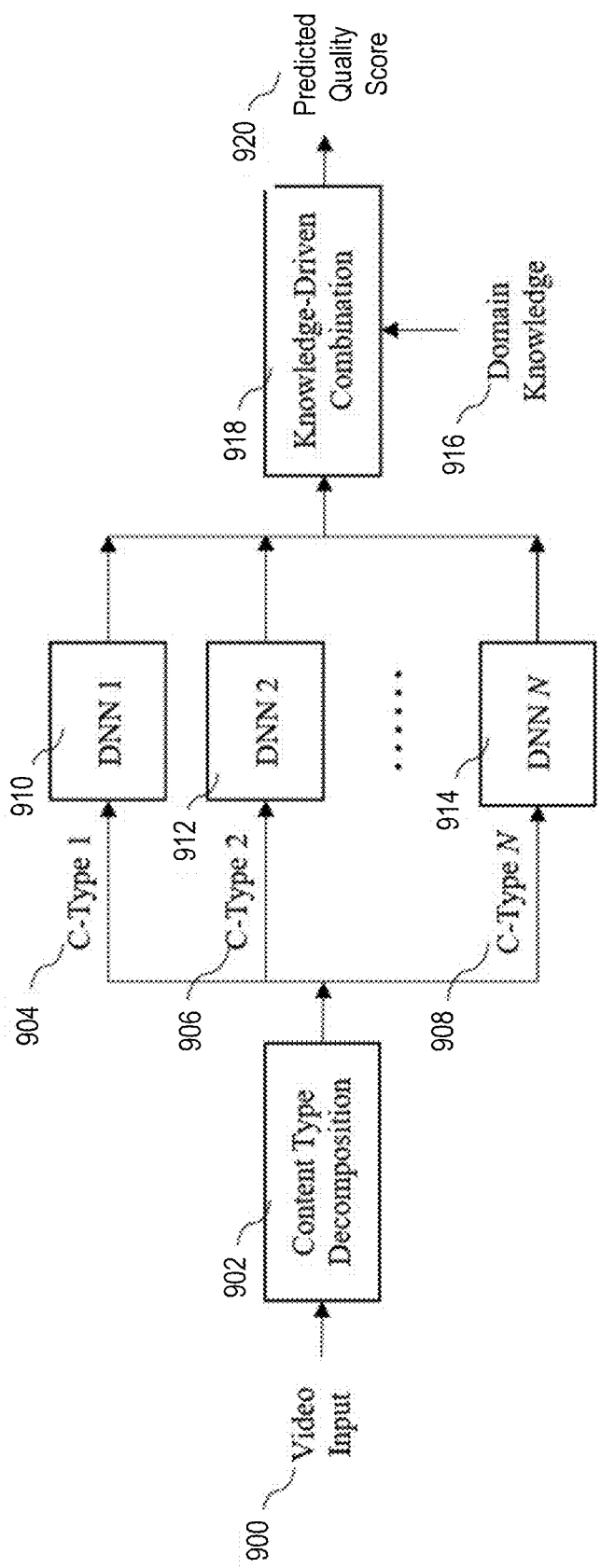
FIG. 9 illustrates the framework and data flow diagram of content analysis based video decomposition followed by per-content type deep neural network computations and domain-knowledge driven combination.

FIG. 9 illustrates the framework and data flow diagram of content analysis based video decomposition followed by per-content type DNN computations and domain-knowledge driven combination. Here, the signal decomposition 502 method may be a content type decomposition 902 that transforms the video input 900 into multiple representations, e.g., as C-Type 1 (element 907), C-Type 2 (element 906), . . . , C-Type N (element 908) as shown. One example of the decomposition method is to classify and segment the scenes or frames of the video into different content categories, such as sports, animation, screen content, news, show, drama, documentary, action movie, advertisement, etc. Another example of the decomposition method is to classify and segment the scenes or frames of the video into different content complexity categories, such as high, moderate, and low complexity categories in terms of one or more of the video's spatial information content (strength and spread of fine texture details, sharp edge features, and smooth regions), temporal information content (amount and speed of camera and object motion), color information content (diversities in hue and saturation), and/or noise level (camera noise, film grain noise, synthesized noise, etc.).

The C-Type representations are fed into a series of DNNs 910, 912, 917, and their outputs are combined using a knowledge-driven approach 918 that is guided by domain knowledge 916, resulting in final quality score 920 of the video input. An example of the domain knowledge 916 used here is the importance and/or weights created through content analysis module 602 that predicts the likelihood of the content types and the importance of each content type in the overall quality assessment.

Figure 10:
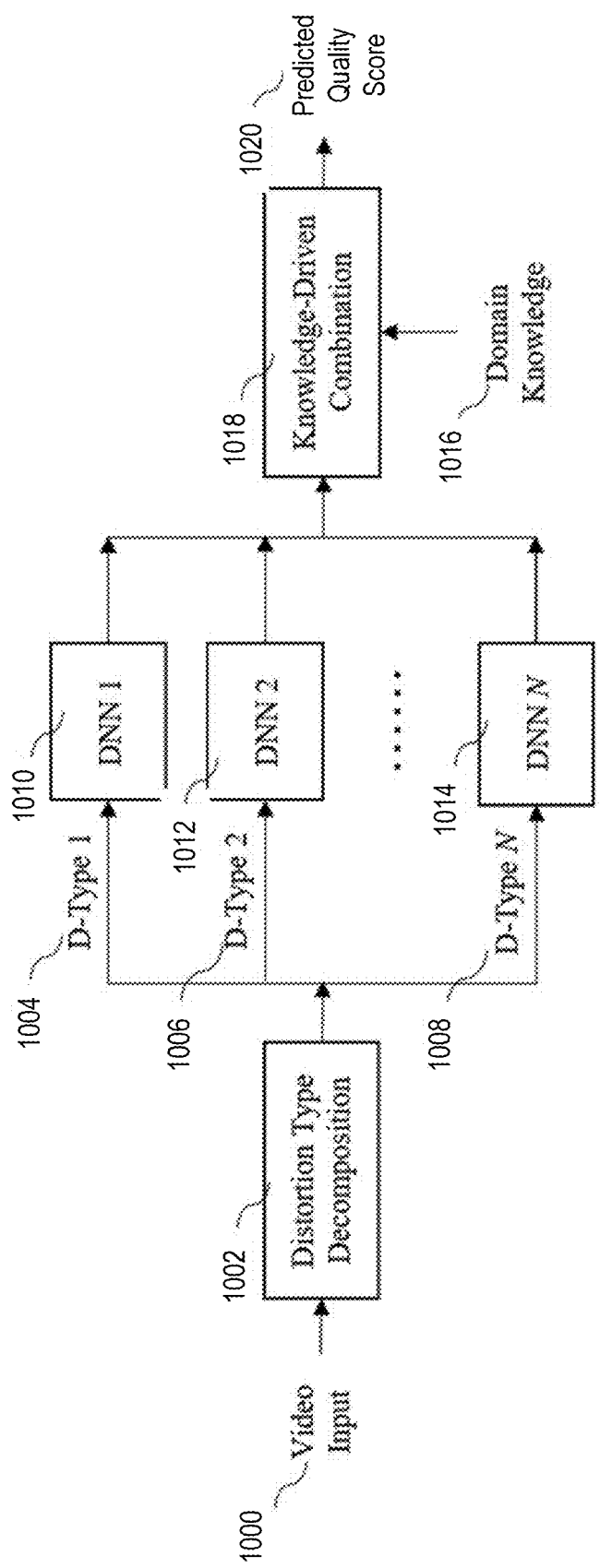
FIG. 10 illustrates the framework and data flow diagram of distortion analysis based video decomposition followed by per-distortion type deep neural network computations and domain-knowledge driven combination.

FIG. 10 illustrates the framework and data flow diagram of distortion analysis based video decomposition followed by per-distortion type DNN computations and domain-knowledge driven combination. Here, the signal decomposition 1002 method may be a distortion type decomposition 1002 that transforms the video input 1000 into multiple representations, e.g., as D-Type 1 (element 1007), D-Type 2 (element 1006), . . . , D-Type N (element 1008) as shown. One example of the decomposition method is to segment the videos into scenes or groups of pictures (GoPs), each of which is associated with an assessment on the likelihoods of containing each of a list of distortion types. Such distortion types may include one or more of blur, blocking, banding, ringing, noise, color shift, color bleeding, skin tone shift, exposure shift, contrast shift, highlight detail loss, shadow detail loss, texture loss, fake texture, flickering, jerkiness, jittering, floating, etc.

The D-Type representations are fed into a series of DNNs 1010, 1012, 1017, and their outputs are combined using a knowledge-driven approach 1018 that is guided by domain knowledge 1016, resulting in final quality score 1020 of the video input. An example of the domain knowledge 1016 used here is the importance and/or weights created through distortion analysis 307 that predicts the likelihood of the distortion types and the importance of each distortion type in the overall quality assessment.

Figure 11:
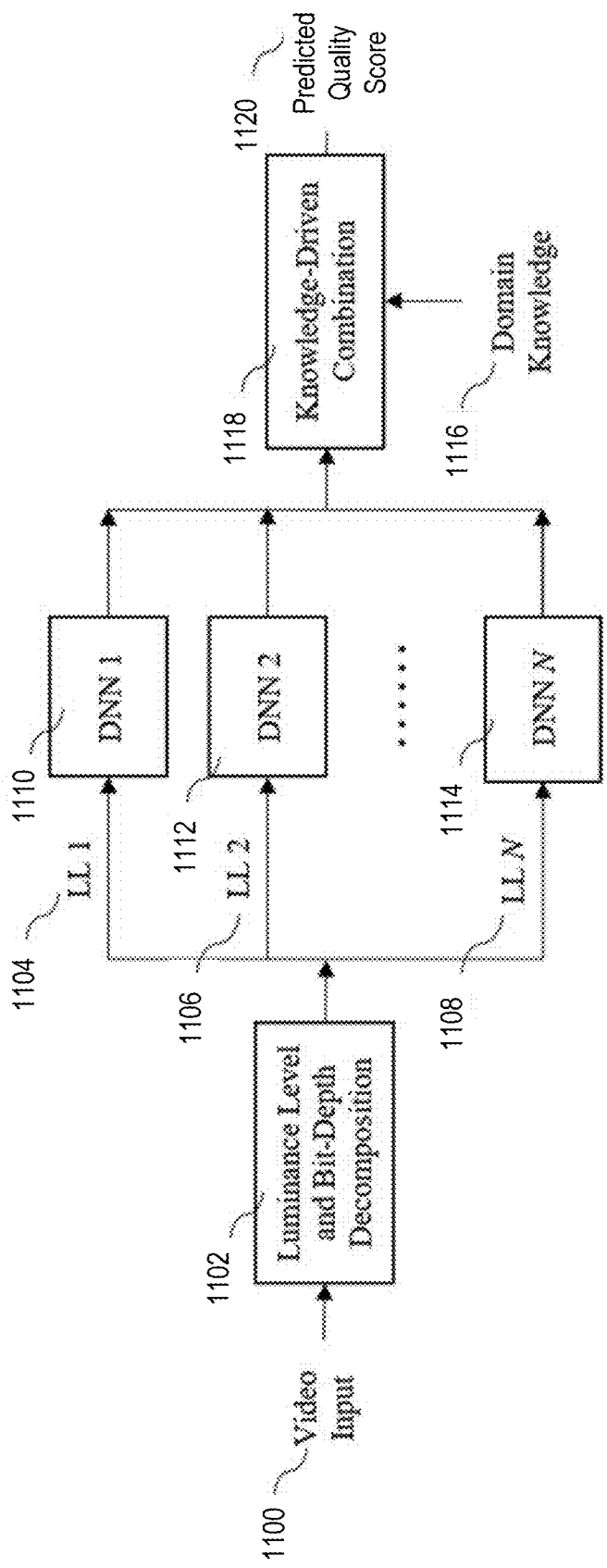
FIG. 11 illustrates the framework and data flow diagram of luminance-level and bit-depth based video decomposition followed by per luminance-level and bit-depth deep neural network computations and domain-knowledge driven combination.

FIG. 11 illustrates the framework and data flow diagram of luminance-level and bit-depth based video decomposition followed by per luminance-level and bit-depth DNN computations and domain-knowledge driven combination. Here, the signal decomposition 1102 method may be a luminance level and bit-depth decomposition 1102 that transforms the video input 1100 into multiple representations, e.g., as luminance level (LL) 1 (element 1107), LL 2 (element 1106), . . . , LL N (element 1108) as shown. One example of the decomposition method is to segment the video scenes or frames into different regions, each of which is associated with a range of luminance levels or bit-depths.

The LL representations are fed into a series of DNNs 1110, 1112, 1117, and their outputs are combined using a knowledge-driven approach 1118 that is guided by domain knowledge 1116, resulting in final quality score 1120 of the video input. An example of the domain knowledge 1116 used here is the importance and/or weights created through viewing device analysis 312, HVS modeling 308, and distortion analysis 307 that assess the importance of each luminance level or bit-depth in the overall quality assessment.

These various inference models may be used to infer a predicted quality of a video content while lacking access to the video content itself. For example, the models may be used to generate a recommendation output 116 to ensure that the video is encoded at a predicted video quality 11 while meeting the customer constraints 114. As another example, the models may be used to form a prediction of end-user video quality accounting for the player metrics 226. Significant, these determinations may be performed based on processing of the source video 102, without use of the end-user video.

Figure 12:
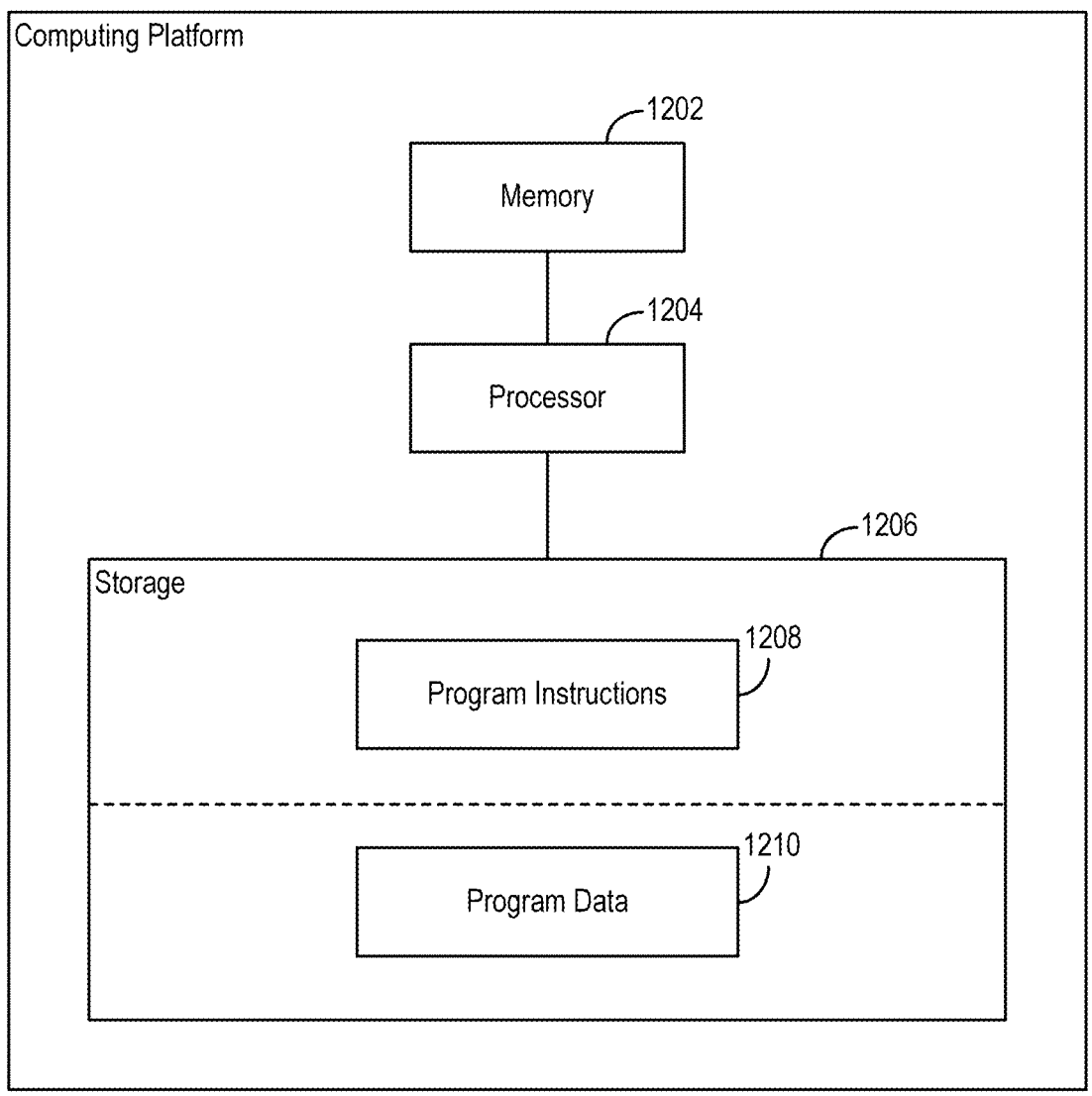
FIG. 12 illustrates an example computing device for the performance of the operations of the recommendation engine predicting of video quality.

FIG. 12 illustrates an example computing device 1200 for the performance of the operations of the recommendation engine predicting of video quality. The algorithms and/or methodologies of one or more embodiments discussed herein, such as those illustrated with respect to FIGS. 1-11, may be implemented using such a computing device 1200. The computing device 1200 may include memory 1202, processor 1204, and non-volatile storage 1206. The processor 1204 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1202. The memory 1202 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1206 may include one or more persistent data storage devices such as a hard drive, optical drive, tape drive, non-volatile solid-state device, cloud storage or any other device capable of persistently storing information.

The processor 1204 may be configured to read into memory 1202 and execute computer-executable instructions residing in program instructions 1208 of the non-volatile storage 1206 and embodying algorithms and/or methodologies of one or more embodiments. The program instructions 1208 may include operating systems and applications. The program instructions 1208 may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by the processor 1204, the computer-executable instructions of the program instructions 1208 may cause the computing device 1200 to implement one or more of the algorithms and/or methodologies disclosed herein. The non-volatile storage 1206 may also include data 1210 supporting the functions, features, and processes of the one or more embodiments described herein. This data 1210 may include, as some examples, the source video input, content parameters, player metrics, quality scores, content complexity scores, domain knowledge, models, and predicted quality scores.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of predicting a full-reference video quality score of a source video after performance of scaling, transcoding, and/or filtering operations, the method comprising:
   identifying a source video quality of the source video;
   identifying a source content complexity of the source video;
   receiving target output video parameters to be applied to the source video;
   applying the source video quality, the source content complexity, and the target output video parameters to a deep neural network (DNN) producing DNN outputs; and
   combining the DNN outputs using domain knowledge to produce an overall predicted quality score of an output video created by applying the target output video parameters to the source video.

2. The method of claim 1, further comprising, in obtaining the domain knowledge, performing content analysis by classifying the source video into different content type categories and/or classifying the source video into different complexity categories.

3. The method of claim 1, further comprising, in obtaining the domain knowledge, performing distortion analysis by detecting different distortion types in the source video and classifying the source video based on distortion type categories or estimating likelihoods of the distortion types.

4. The method of claim 1, further comprising, in obtaining the domain knowledge, performing HVS modeling by using viewing condition and device parameters.

5. The method of claim 4, further comprising incorporating human visual contrast sensitivity function, luminance masking, contrast masking, texture masking, visual attention, and fixation properties into the HVS modeling.

6. The method of claim 1, further comprising, in obtaining the domain knowledge, performing viewing device analysis using viewing device parameters.

7. The method of claim 1, further comprising aggregating content analysis, distortion analysis, HVS modeling, and viewing device analysis into the domain knowledge.

8. The method of claim 1, further comprising, using one or more of average, weighted average, feedforward neural networks, or support vector regression approaches to combine the DNN outputs and the domain knowledge to produce the overall predicted quality score.

9. The method of claim 1, further comprising:
   using a scale or resolution decomposition to transform the source video into multi-scale multi-resolution representations;
   passing the multi-scale multi-resolution representations into the DNN; and
   combining the DNN outputs using the domain knowledge based on HVS modeling, wherein the HVS modeling predicts a visual relevance of each of the multi-scale multi-resolution representations.

10. The method of claim 9, further comprising using one or more of Fourier transforms, a discrete cosine transform (DCT), a discrete sine transform (DST), a wavelet transform, a Gabor transform, a Haar transform, a Laplacian pyramid transform, a Gaussian pyramid transform, or a steerable pyramid transform to perform the decomposition into the multi-scale multi-resolution representations.

11. The method of claim 1, further comprising:
   using a spatiotemporal decomposition to transform the source video into multiple spatiotemporal channel representations;
   passing the spatiotemporal channel representations into the DNN; and
   combining the DNN outputs using the domain knowledge based on spatiotemporal HVS modeling that predicts a visual relevance of each of the spatiotemporal channel representations.

12. The method of claim 11, further comprising using one or more of 3D Fourier transforms, a 3D DCT, a 3D wavelet transform, a 3D Gabor transform, a 3D Haar transform, a 3D Laplacian pyramid transform, or a 3D Gaussian pyramid transform for performing the spatiotemporal decomposition.

13. The method of claim 1, further comprising:
using a content type decomposition to transform the source video into content type representations in terms of segments of different content categories and/or complexity categories;
passing the content type representations into the DNN; and
combining the DNN outputs using the domain knowledge based on content analysis that predicts a likelihood and importance of the content categories and/or complexity categories.

14. The method of claim 13, further comprising, with respect to the content type decomposition, classifying the source video into high, moderate, and low complexity categories in terms of one or more of spatial information content, temporal information content, color information content, and/or noise level of the source video.

15. The method of claim 1, further comprising:
using a distortion type decomposition to transform the source video into distortion type representations in terms of video segments each associated with likelihoods of containing each of a list of distortion types;
passing the distortion type representations into the DNN; and
combining the DNN outputs using the domain knowledge based on distortion analysis that predicts a likelihood and importance of each distortion type.

16. The method of claim 1, further comprising:
using a luminance level and bit-depth decomposition to transform the source video into multiple luminance level representations;
passing the luminance level representations into the DNN; and
combining the DNN outputs using the domain knowledge based on viewing device analysis, HVS modeling, and distortion analysis that assess an importance of each luminance level or bit-depth.

17. A method of predicting bitrate, codec, resolution, or other filter parameters for a filter chain to achieve a full reference video quality score for encoding an input source video, the method comprising:
identifying a source video quality of the source video;
identifying a source content complexity of the source video;
receiving parameter constraints with respect to the parameters;
applying the source video quality, the source content complexity, and the parameter constraints to a deep neural network (DNN) producing DNN outputs; and
combining the DNN outputs using domain knowledge to provide the filter parameters, as predicted, to the filter chain, such that applying the filter chain to the input source video results in an output video achieving the full reference video quality score.

18. The method of claim 17, wherein the filter chain includes a series of operations to be performed on the source video, the series of operations including one or more of a rescaling operation or a transcoding operation.

19. The method of claim 17, wherein the parameter constraints include one or more of a target output quality score, a predefined bitrate, a specified codec, or a specified resolution.

20. The method of claim 17, further comprising, in obtaining the domain knowledge, performing content analysis by classifying the source video into different content type categories and/or classifying the source video into different complexity categories.

21. The method of claim 17, further comprising, in obtaining the domain knowledge, performing distortion analysis by detecting different distortion types in the source video and classifying the source video based on distortion type categories or estimating likelihoods of the distortion types.

22. The method of claim 17, further comprising, in obtaining the domain knowledge, performing HVS modeling by using viewing condition and device parameters.

23. The method of claim 22, further comprising incorporating human visual contrast sensitivity function, luminance masking, contrast masking, texture masking, visual attention, and fixation properties into the HVS modeling.

24. The method of claim 17, further comprising, in obtaining the domain knowledge, performing viewing device analysis using viewing device parameters.

25. The method of claim 17, further comprising aggregating content analysis, distortion analysis, HVS modeling, and viewing device analysis into the domain knowledge.

26. The method of claim 17, further comprising, using one or more of average, weighted average, feedforward neural networks, or support vector regression approaches to combine the DNN outputs and the domain knowledge to produce the overall quality score.

27. The method of claim 17, further comprising:
using a scale or resolution decomposition to transform the source video into multi-scale multi-resolution representations;
passing the multi-scale multi-resolution representations into the DNNs; and
combining the DNN outputs using the domain knowledge based on the HVS modeling, wherein the HVS modeling predicts the visual relevance of each of the multi-scale multi-resolution representations.

28. The method of claim 27, further comprising using one or more of Fourier transforms, the discrete cosine transform (DCT), the discrete sine transform (DST), the wavelet transform, the Gabor transform, the Haar transform, the Laplacian pyramid transform, the Gaussian pyramid transform, or the steerable pyramid transform to perform the multi-scale multi-resolution decomposition.

29. The method of claim 17, further comprising:
using a spatiotemporal decomposition to transform the source video into multiple spatiotemporal channel representations;
passing the spatiotemporal representations into the DNNs; and
combining the DNN outputs using the domain knowledge based on spatiotemporal HVS modeling that predicts the visual relevance of each of the spatiotemporal channel representations.

30. The method of claim 29, further comprising using one or more of 3D Fourier transforms, the 3D DCT, the 3D wavelet transform, the 3D Gabor transform, the 3D Haar transform, the 3D Laplacian pyramid transform, or the 3D Gaussian pyramid transform for performing the spatiotemporal decomposition.

31. The method of claim 17, further comprising:
using a content type decomposition to transform the source video into content type representations in terms of segments of different content categories and/or complexity categories;
passing the content type representations into the DNNs; and combining the DNN outputs using the domain knowledge based on content analysis that predicts the likelihood and importance of the content and complexity categories.

32. The method of claim 31, further comprising, with respect to the content type decomposition, classifying the source video into high, moderate, and low complexity categories in terms of one or more of spatial information content, temporal information content, color information content, and/or noise level of the source video.

33. The method of claim 17, further comprising:
using a distortion type decomposition to transform the video input into distortion type representations in terms of video segments each associated with likelihoods of containing each of a list of distortion types;
passing the distortion type representations into the DNNs; and
combining the DNN outputs using the domain knowledge based on distortion analysis that predicts the likelihood and importance of each distortion type.

34. The method of claim 17, further comprising:
using a luminance level and bit-depth decomposition to transform the video input into multiple luminance level representations;
passing the luminance level representations into the DNNs; and
combining the DNN outputs using the domain knowledge based on viewing device analysis, HVS modeling, and distortion analysis that assess the importance of each luminance level or bit-depth.

35. A method of predicting a full-reference video quality score of a source video after performance of scaling, transcoding, and/or filtering operations, the method comprising:
identifying a source video quality of the source video;
identifying a source content complexity of the source video;
receiving content parameters of the source video;
receiving player metrics indicative of aspects of playback by a consumer device of an output video corresponding to the source video;
receiving parameter constraints with respect to parameters of the output video;
applying the source video quality, the source content complexity, the content parameters, the parameter constraints, and the player metrics to a deep neural network (DNN) producing DNN outputs; and
combining the DNN outputs using domain knowledge to produce an overall predicted quality score of the output video, without accessing the output video.

36. The method of claim 35, wherein the player metrics are indicative of buffering events and/or profile changes at the consumer device.

37. The method of claim 35, further comprising, in obtaining the domain knowledge, performing content analysis by classifying the source video into different content type categories and/or classifying the source video into different complexity categories.

38. The method of claim 35, further comprising, in obtaining the domain knowledge, performing distortion analysis by detecting different distortion types in the source video and classifying the source video based on distortion type categories or estimating likelihoods of the distortion types.

39. The method of claim 35, further comprising, in obtaining the domain knowledge, performing HVS modeling by using viewing condition and device parameters.

40. The method of claim 39, further comprising incorporating human visual contrast sensitivity function, luminance masking, contrast masking, texture masking, visual attention, and fixation properties into the HVS modeling.

41. The method of claim 35, further comprising, in obtaining the domain knowledge, performing viewing device analysis using viewing device parameters.

42. The method of claim 35, further comprising aggregating content analysis, distortion analysis, HVS modeling, and viewing device analysis into the domain knowledge.

43. The method of claim 35, further comprising, using one or more of average, weighted average, feedforward neural networks, or support vector regression approaches to combine the DNN outputs and the domain knowledge to produce the overall predicted quality score.

44. The method of claim 35, further comprising:
using a scale or resolution decomposition to transform the source video into multi-scale multi-resolution representations;
passing the multi-scale multi-resolution representations into the DNN; and
combining the DNN outputs using the domain knowledge based on HVS modeling, wherein the HVS modeling predicts a visual relevance of each of the multi-scale multi-resolution representations.

45. The method of claim 44, further comprising using one or more of Fourier transforms, a discrete cosine transform (DCT), a discrete sine transform (DST), a wavelet transform, a Gabor transform, a Haar transform, a Laplacian pyramid transform, a Gaussian pyramid transform, or a steerable pyramid transform to perform the decomposition into the multi-scale multi-resolution representations.

46. The method of claim 35, further comprising:
using a spatiotemporal decomposition to transform the source video into multiple spatiotemporal channel representations;
passing the spatiotemporal channel representations into the DNN; and
combining the DNN outputs using the domain knowledge based on spatiotemporal HVS modeling that predicts a visual relevance of each of the spatiotemporal channel representations.

47. The method of claim 46, further comprising using one or more of 3D Fourier transforms, a 3D DCT, a 3D wavelet transform, a 3D Gabor transform, a 3D Haar transform, a 3D Laplacian pyramid transform, or a 3D Gaussian pyramid transform for performing the spatiotemporal decomposition.

48. The method of claim 35, further comprising:
using a content type decomposition to transform the source video into content type representations in terms of segments of different content categories and/or complexity categories;
passing the content type representations into the DNN; and
combining the DNN outputs using the domain knowledge based on content analysis that predicts a likelihood and importance of the content categories and/or complexity categories.

49. The method of claim 48, further comprising, with respect to the content type decomposition, classifying the source video into high, moderate, and low complexity categories in terms of one or more of spatial information content, temporal information content, color information content, and/or noise level of the source video.

50. The method of claim 35, further comprising:
using a distortion type decomposition to transform the source video into distortion type representations in terms of video segments each associated with likelihoods of containing each of a list of distortion types;

passing the distortion type representations into the DNN; and combining the DNN outputs using the domain knowledge based on distortion analysis that predicts a likelihood and importance of each distortion type.

51. The method of claim 35, further comprising:

using a luminance level and bit-depth decomposition to transform the source video into multiple luminance level representations;

passing the luminance level representations into the DNN; and combining the DNN outputs using the domain knowledge based on viewing device analysis, HVS modeling, and distortion analysis that assess an importance of each luminance level or bit-depth.

* * * * *